United States Patent [19]

Lai et al.

[11] Patent Number: 5,071,141
[45] Date of Patent: Dec. 10, 1991

[54] SPIRAL GROOVE SEAL ARRANGEMENT FOR HIGH VAPOR-PRESSURE LIQUIDS

[75] Inventors: Wei-Tang Lai, Hoffman Estates; Glenn G. Pecht, Wheeling, both of Ill.

[73] Assignee: John Crane Inc., Morton Grove, Ill.

[21] Appl. No.: 553,570

[22] Filed: Jul. 17, 1990

[51] Int. Cl.$^5$ .............................................. F16J 15/34
[52] U.S. Cl. .................................. 277/65; 277/96.1; 277/81 R; 277/93 SD
[58] Field of Search .................. 277/65, 93 SD, 96.1, 277/81 R, 93 R, 96, 26

[56] References Cited

U.S. PATENT DOCUMENTS

| | | | |
|---|---|---|---|
| 3,527,465 | 9/1970 | Guinard | 277/96.1 X |
| 3,704,019 | 11/1972 | McHugh | 277/96.1 X |
| 4,212,475 | 7/1980 | Sedy | 277/93 SD X |
| 4,889,348 | 12/1989 | Amundson et al. | 277/65 X |

FOREIGN PATENT DOCUMENTS 644840 7/1982 Canada .................................. 277/96.1

Primary Examiner—William A. Cuchlinski, Jr.
Assistant Examiner—James Folker
Attorney, Agent, or Firm—Kinzer, Plyer, Dorn, McEachran & Jambor

[57] ABSTRACT

A seal system is disclosed for sealing a housing and rotatable shaft against leakage of high vapor-pressure liquids such as natural gas. The method of sealing comtemplates phase change of the liquefied hydrocarbon fluid across a first module. The gas so formed is contained by a second seal module which operates as a dry running gas seal. The seal system has plural, axially spaced spiral-groove seal modules mounted between the shaft and housing. Each seal module has a primary ring affixed to the housing and a mating ring affixed for rotation with the shaft and the modules define an intermediate cavity. The rings have opposed, radially extending faces, one of which has a plurality of downstream pumping spiral grooves extending from one circumference. The grooves of the grooved ring of the upstream module have a pattern which upon shaft rotation creates shear heating of the liquefied hydrocarbon fluid. The pattern has a land/groove surface area ratio greater than one and preferably a ratio of approximately three. The dam portion relative to groove portion surface area is also preferably greater than one and the preferred dam/groove ratio is approximately three.

18 Claims, 3 Drawing Sheets

SPIRAL GROOVE SEAL ARRANGEMENT FOR HIGH VAPOR-PRESSURE LIQUIDS

BACKGROUND OF THE INVENTION

1. Field of the Invention

This invention relates to seals for preventing leakage of a fluid about a shaft extending through the housing of a rig, such as a pump. The invention is particularly concerned with a seal for containing high vapor-pressure liquids, such as liquefied light hydrocarbon gases and the method of sealing such fluids.

2. Background Art

Two types of spaced apart mechanical end face seal systems have been used in the past for containing high vaporpressure liquids. These systems were of the "wet," contacting type which had to be cooled by a buffer liquid pumped between two axially spaced mechanical seal faces. The system for circulating the buffer liquid (frequently oil) includes pumps, coolers and reservoirs which add complexity and expense to the apparatus. Further, the mechanical seals, even with their complicated support system, often last only a few days in pumps handling liquefied light hydrocarbons.

It is known that another type of mechanical end face seal, known as a dry running gas seal, can be operated without oil lubrication when one of the faces is provided with a series of spiral grooves. Seals of this type are shown and described in U.S Pat. No. 4,212,475, issued to Josef Sedy and assigned to the present assignee. The subject matter of this patent is incorporated by reference herein. This latter type of seal has been used to solve gas containment problems. In U.S. Pat. No. 4,212,475, Sedy discloses and claims optimum parameters for dry running gas seals. These parameters include a dam width ratio, groove depth, groove angle and balance ratio. The seal described in Sedy is directed to the containment of fluids which are already in a gaseous state and under high pressure.

This invention seeks to provide an end face seal arrangement which is particularly appropriate for use in equipment for handling liquids having high vapor-pressure, such as liquefied light hydrocarbons. This is accomplished in part by ignoring, to some extent, the conventional wisdom which is to cool the opposing faces of the seal. Instead, the seal is intended to create shear heating of the sealed fluid between the seal faces of a first stage or module which, it is believed, causes phase change of the liquid to a gas, thus providing a sealing capacity. An optional second stage dry running gas seal may also be used to effectively contain the vaporized fluid.

Generally, the ratio of circumferential length of the grooved surfaces relative to that of the ungrooved surfaces, disposed between the groove surfaces and known as lands, is an important parameter of seal face design. This land/groove ratio is commonly a one-to-one ratio.

In the radial direction, an annular band comprising grooves and lands form a groove portion at one radial face edge and a smooth, totally ungrooved annular band at the other radial face edge of the sealing face. The ratio of radial width of the dam portion to the groove portion is referred to as the dam width ratio. A dam width ratio of one-to-one is commonly used in mechanical seals. Sedy discloses and defines a dam width ratio of between approximately 0.5 and 0.8 in U.S. Pat. No. 4,212,475.

These ratios of radial and circumferential dimensions are sufficient to provide a noncontacting mechanical face seal for sealing of gases. However, special considerations are necessary when sealing fluids such as highly volatile liquids. For example, liquid natural gas is in gaseous form at normal temperatures and pressures. Under higher pressures and lower temperatures, natural gas is in liquid form. The mechanical face seals and sealing face designs presently in use may be improved according to the present invention by providing for increased shear heating of the liquid natural gas when it is passing through the seal. Shear heating raises the temperature of the liquid natural gas and converts it into a gas, which is easier to seal and which will minimize leakage.

One approach to providing a face seal configuration for a high vapor-pressure liquid application is proposed in U.S. Pat. No. 4,889,348, issued to Amundson et al and assigned to the present assignee. The subject matter of that patent is incorporated by reference herein where appropriate. A dual seal module system using an inboard, upstream and an outboard downstream module, one each mounted on the shaft and housing, has been proposed by Amundson et al. Each seal module has a primary ring affixed to the housing and a mating ring affixed to the shaft. The rings have opposing, radially extending faces, one of which has a plurality of downstream pumping spiral grooves extending from one circumference of the seal face. The grooves of at least the ring of the upstream module have a depth which was described as being no more than about 100 micro-inches. The depth of grooves of the second or downstream module were recited as being not less than the depth of grooves of the upstream module. The downstream module groove depth was also described as being no more than about 200 micro-inches.

SUMMARY OF THE INVENTION

The present invention is directed to a mechanical end face seal and method which is appropriate for equipment handling liquefied light hydrocarbons or other high vapor-pressure liquids. This is accomplished through the use of a seal arrangement having an upstream seal module and a downstream seal module, as in U.S. Pat. No. 4,889,348, or alternatively, to a single module system, as is described in U.S. Pat. No. 4,212,475. The improvement provided by the present invention can be used adequately with either of the sealing systems described in these two patents.

It should be understood that although the invention can be used to provide a sealing means for a single module, it is preferable that a second module be used for reasons of safety. Moreover, a second module, having rings with groove depths greater than the groove depths of the rings in the first module, provides a more precise pressure regulation for the liquid which will have been vaporized and will be contained in the chamber between the two modules.

One object of the present invention is to provide a sealing arrangement whereby the seal face configuration is capable of sealing a high vapor-pressure liquid with a gas film between the sealing faces which is created by shear heating of the sealed liquid between the sealing faces to produce a phase change.

Another object of the present invention is to provide a mechanical end face seal configuration where one of the sealing faces of a ring has disposed within it grooves which are easier to produce and which do not require the precision of presently known and used seal face configurations in liquid-to-gas phase change mechanical seals.

Accordingly, the present invention provides for a seal face configuration with the capability of shear heating a high vapor-pressure liquid, such as liquid natural gas, to produce a gas film between the sealing faces of a primary and mating ring of a mechanical seal. The shear heating for liquid-to-gas phase change provides increased temperatures and is produced by the faces as they rotate relative to each other.

There is also provided a sealing ring for a spiral groove mechanical face seal system, wherein the sealing ring comprises a radially extending seal face having first and second circumferential edges and includes a plurality of downstream pumping spiral grooves extending inwardly from the first circumferential edge of the seal face to a circumferential boundary line intermediate the first and second circumferential edges, the circumferential boundary line and the second circumferential edge define a dam portion having a radial width taken along a radius between the second circumferential edge and the intermediate boundary line, the spiral grooves in the groove portion being separated by a plurality of lands disposed between the spiral grooves, the surface of the lands being in a plane substantially coextensive with a plane defined by the dam portion of the sealing ring, the grooves and lands further define a groove surface area and a land surface area, and a ratio of the land surface area relative to the groove surface area being greater than one. Alternatively, or in conjunction, the ratio of the groove portion to the dam portion is greater than one.

DESCRIPTION OF THE PREFERRED EMBODIMENT

Figure 1:
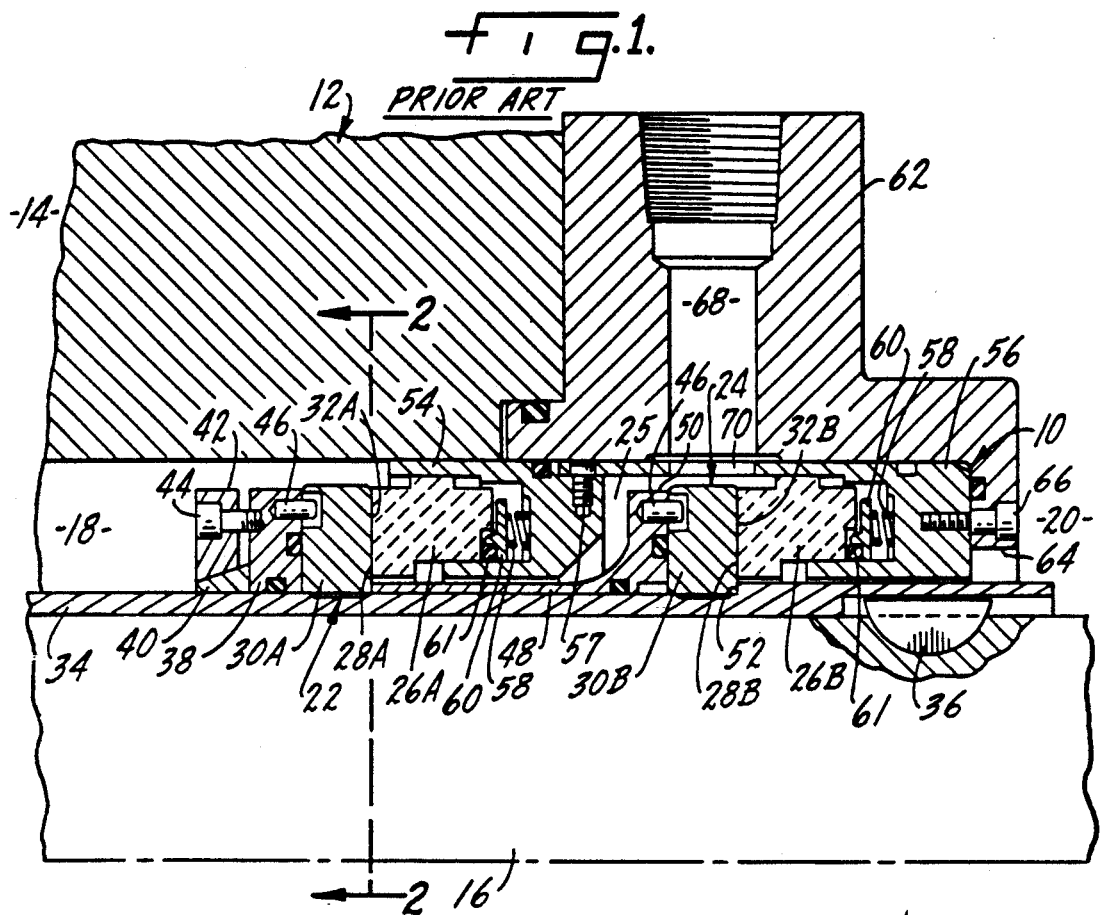
FIG. 1 is a side elevational view in section taken along a vertical centerline of a portion of a presently used dual module mechanical face seal.

FIG. 1 illustrates a seal designated 10 constructed in accordance with the teaching of U.S. Pat. No. 4,889,348. The seal is designed to contain within a pump housing liquefied light hydrocarbons and other high vapor-pressure liquids such as liquid natural gas (LNG), liquefied petroleum gas (LPG) including methane, ethylene, ethane, propane, butane and pentane. The housing is indicated at 12 enclosing the pump interior 14. A shaft 16 extends through an opening 18 in the housing 12 to the atmosphere 20.

Generally speaking, the seal 10 has a tandem arrangement of spiral groove mechanical end face seals, each having portions mounted on the housing and shaft. The seals are generally of the type shown in U.S. Pat. No. 4,212,475, referred to above. The tandem seals include an upstream or inboard seal module 22 and a downstream or outboard seal module 24 which define an annular chamber 25 between them. Each seal module has a pair of annular rings comprising primary rings 26A, 26B with radially extending faces 28A, 28B and mating rings 30A, 30B having radially extending faces 32A, 32B opposite the faces 28A, 28B of the primary rings. The primary rings 26A, 26B are affixed to the housing by a retainer assembly. Similarly, the mating rings 30A, 30B are affixed for rotation with the shaft 16 by a sleeve assembly.

The sleeve assembly includes a shaft sleeve 34 which fits upon the shaft 16 and is held against rotation by a drive key 36 or other means (not shown). Sleeve 34 is fixed to the shaft by appropriate means (not shown) to prevent outward axial motion of the sleeve. An O-ring is also positioned at a flanged portion of sleeve 34 to seal between the sleeve and shaft. The upstream seal module 22 includes a support 38 positioned by an annular split wedge 40 which in turn is held by a clamping ring 42. A cap screw 44 connects the clamping ring 42 and mating ring support 38 to compress wedge 40 against sleeve 34. A pin 46 connects the mating ring 30A to the mating ring support 38. O-rings are provided as shown on the mating ring support to form a seal between the shaft and mating ring support.

The sleeve assembly further includes a spacer sleeve 48 having a support flange 50, which holds a pin 46 to engage and drive the mating ring 30B of the outboard seal module 24. Again, O-rings are supplied on the flange 50 as shown. The spacer sleeve 48 extends to and engages the radial surface 32A adjacent the inside diameter of the mating ring 30A. Thus, the mating rings 30A, 30B and their respective supports 38 and 50 are locked between the wedge 40 and shoulder 52 on the shaft sleeve 34.

The retainer assembly comprises inboard and outboard retainers 54 and 56 connected by cap screws 57. The inboard retainer 54 mounts the inboard primary ring 26A. The outboard retainer 56 similarly mounts the outboard primary ring 26B. Each retainer carries multiple springs 58 and discs 60 which urge the primary rings into engagement with the mating rings. The discs 60 and springs 58 permit primary rings 26A and 26B to move axially of the shaft. O-ring seals 61 provide a secondary seal between discs 60 and retainers 54 and 56.

A gland plate 62 connects to housing 12. The plate is attached to the housing by screws (not shown). The gland plate has a flange 64 engaging the outer end face of the retainer 56. The retainer is connected to the flange by cap screws 66. Suitable O-rings are provided as shown to seal the gland plate against the housing 12 and retainers 54, 56. A vent passage 68 communicates with an opening 70 in the retainer 56 and chamber 25. The vent passage 68 is connectable to a flare stack or other combustion apparatus for disposing of the controlled amount of gas passing across the rotating faces of upstream seal module 24. Such gas may, for example, be used for heating buildings associated with the apparatus containing the seal or recompressed for other uses.

Figure 2:
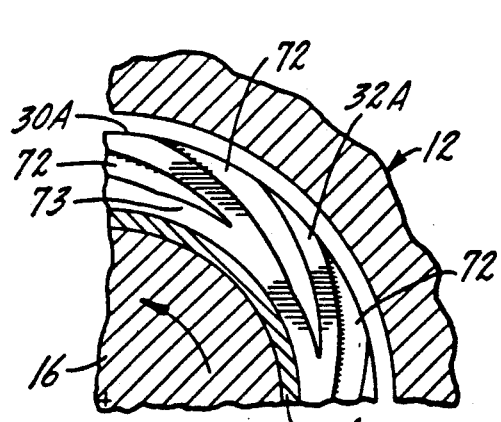
FIG. 2 is an end view of a segment of a conventional sealing ring.

FIG. 2 shows a portion of a mating surface on either the mating ring or primary ring according to the teaching found in U.S. Pat. No. 4,889,348. For purposes of description, the face 32A of mating ring 30A is shown. The face has plurality of downstream pumping spiral grooves 72 extending from the outer circumference partia across the width of the face 32A. The ungrooved surface 73 defines a sealing dam which provides a contacting static seal when the seal faces are not rotating relative to each other. Face 32B is similarly configured.

When the shaft is not rotating, pressurized fluid is contained by contact between the rings at the sealing dam 73.

When the shaft starts rotating, the grooves 72 pump fluid between the seal faces causing primary rings to move slightly axially of the shaft. A portion of the liquid enters the resulting gap where it is subjected to high shear stress, which raises the temperature of the liquid and causes a change in phase from liquid to gas. The downstream seal module provides a second barrier along the shaft so that escaping gas is forced to flow out the vent 68 where it can be disposed of as previously described. It is also contemplated that if leakage is sufficiently low, as provided by the present invention, no combustion apparatus would be required. Leakage across the downstream seal is minimal and is considered negligible.

The teaching of U.S. Pat. No. 4,889,348 relies on the depth of the grooves on the inside and outside seal modules to provide acceptable performance when sealing against high vapor-pressure liquids, such as light hydrocarbons. In particular, the groove depth of the upstream seal module was disclosed as being substantially less than the preferred embodiment of a dry running gas seal as defined in the aforementioned Sedy U.S. Pat. No. 4,212,475. The groove depth is disclosed as not exceeding 100 micro-inches. The groove depth of the grooved ring of the downstream module is disclosed as being not less than the groove depth of the upstream module and not to exceed 200 micro-inches. Optimum operating parameters of the equipment and details of the use of the decreased groove depth for sealing highly volatile hydrocarbons can be found in the aforementioned U.S. Pat. No. 4,889,348.

Figure 3:
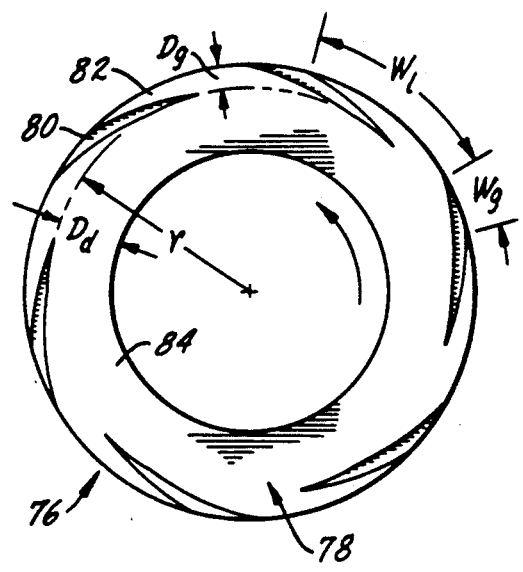
FIG. 3 is an end view of one of the sealing rings of a preferred embodiment of the invention.

Referring now to FIG. 3, seal ring 76 has a seal face 78 constructed in accordance with a preferred embodiment of the present invention. Seal face 78 seals against the mating face of an annular ring (not shown), as in the prior art and comprises two annular portions, a groove portion having grooves 80 and lands 82, and an ungrooved dam portion defining a dam 84. The groove portion has a radial dimension along arrow r, indicated by $D_g$, and the dam portion has a radial dimension, indicated by $D_d$. The dam 84 forming the dam portion has a uniform height relative to the plane of the seal face 78 around the complete circumference of the seal face. It is understood by those skilled in the art that the dam portion 84 does not provide for mating across the complete annular surface of the ring, but has provided for the spacer sleeve 48 to cover some portion of the dam surface 84. The surface of the lands 82 and of dam 84 is polished to a high degree of flatness.

The radial width of the grooved portion of seal face 78 is consistently uniform around the periphery of seal face 78. The circumferential width $W_g$ is identical at the outer diameter of face 78 for each of the spiral grooves 80. The circumferential width $W_l$ of each of the lands 82 is also identical when measured at the outer diameter of the face 78. Both of the circumferential widths $W_l$ and $W_g$ decreases as measurements are taken increasingly toward the center of the ring 76, but the ratio of dimensions $W_l/W_g$ (land/groove ratio) taken at any given radius is identical. The ratio is also identical within the complete annular grooved ring defined by the radial width Dg. In other words, the ratio $W_l/W_g$ is the same whether taken at the outer diameter of seal face 78 or taken at the boundary between the groove and dam portions.

Alternatively, grooves having surface boundaries which differ from the regular boundaries of grooves 80 are possible. One important attribute of regularly configured spiral grooves is that fluid between the sealing faces is transposed in the direction of curvature. It is known that non-spiral configurations can also transpose fluid between the sealing faces of a seal, and it is contemplated that these can be used together with the teaching of the present invention. One consideration in that regard is a ratio of land area to groove area within the groove portion of the seal face.

One feature of the invention is that an increase in the ratio of land/groove surface area provides an increase in the shear heating necessary to vaporize the sealed fluid.

It has been found that altering the ratios of the surface areas of the lands relative to the grooves or of the circumferential width of the lands to grooved portions ($W_l/W_g$), greater or lesser sealing gaps can be obtained between the radially extending sealing faces of the rings. Similarly, increasing o decreasing the ratio of the radial dimension of the dam to grooved portion has a similar effect on the sealing gap. In particular, FIG. 3 illustrates a sealing face 78 having preferred ratios of those dimensions.

It has been found that a ratio of 3:1 in $W_l/W_g$ and a ratio of 3:1 in $D_d/D_g$ are optimal in providing the preferred sealing gap for volatile, high-vapor pressure liquids, such as liquefied natural gas. It is believed that the increased dam/groove ratio ($D_d/D_g$) provides more frictional shearing heat which converts more of the liquid to gas than prior art seals as it is pumped by the grooves from the outer diameter to the inner diameter. Moreover, the increased land groove ratio provides a higher heat input for a phase change in the lessened amount of leakage liquid at the outer diameter. The smaller sealing gap reduces the leakage of the liquid through the upstream or inboard seal module, and heats up the liquefied natural gas which changes phase at a faster rate.

Although any high vapor pressure liquid can be used, it has been found that the seal face according to the present invention works ideally for liquefied natural gas. A seal face having the disclosed land/groove and dam/groove width ratios will more fully vaporize the liquefied gas. Other face configurations utilizing different ratios of circumferential width and radial dimension may be utilized and other configurations may be more appropriate for a variety of applications or high-vapor pressure liquids.

Figure 5:
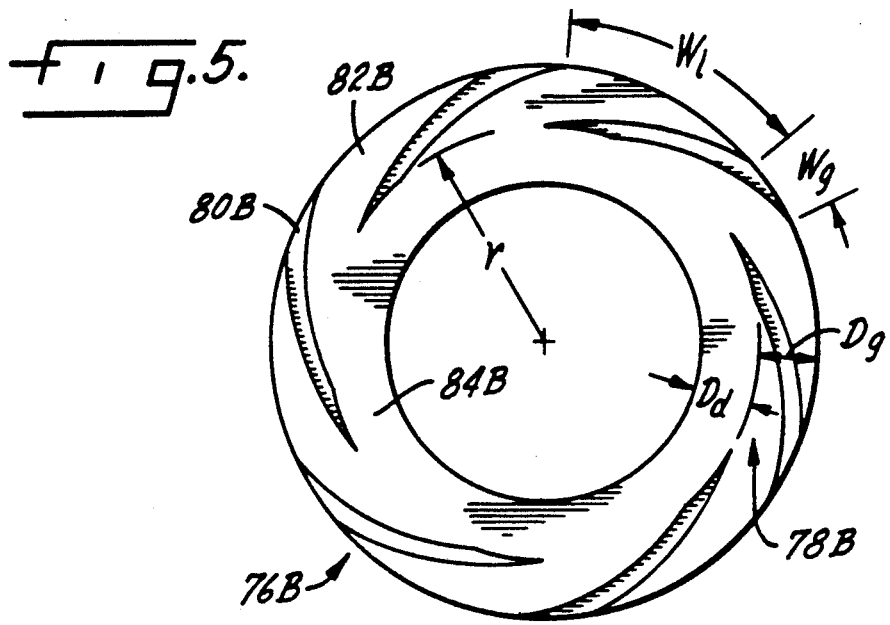
FIG. 5 is an end view of a sealing ring having an alternative embodiment of the invention.
Figure 4:
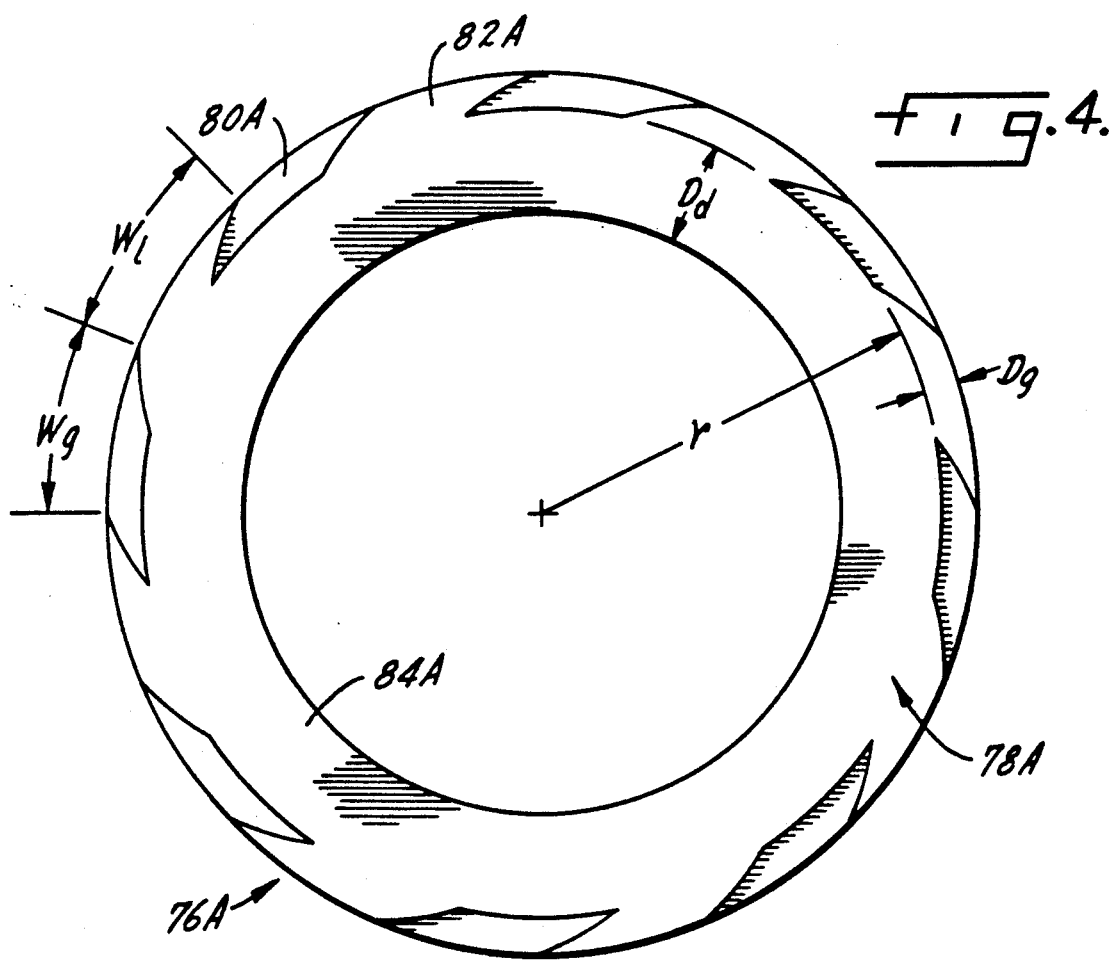
FIG. 4 is an end view of a sealing ring having an alternative embodiment of the invention.

For example, FIGS. 4 and 5 illustrate alternative embodiments of sealing faces. Numerals in FIGS. 4 and 5 indicate identical elements as those shown in FIG. 3, except similar elements are indicated with an A indication in FIG. 4 and a B indication in FIG. 5.

FIG. 4 illustrates a ring having a sealing face 76A in which the ratio of the widths of lands 82A to the width of grooves 80A ($W_l/W_g$) is 1:1 and the ratio of the dam portion 84A to groove portion is 3:1. Similarly, FIG. 5 illustrates a ring having a sealing face 76B in which the ratio of the circumferential width of the lands 82B relative to the circumferential width of the grooves 80B ($W_l/W_g$) is 3:1 or greater, and the ratio of the dam portion 84 relative to the groove portion is 1:1. Specific applications of the embodiments illustrated in FIGS. 4 and 5 can be used in applications which are suited for providing the required amount of heat shearing.

Figure 6:
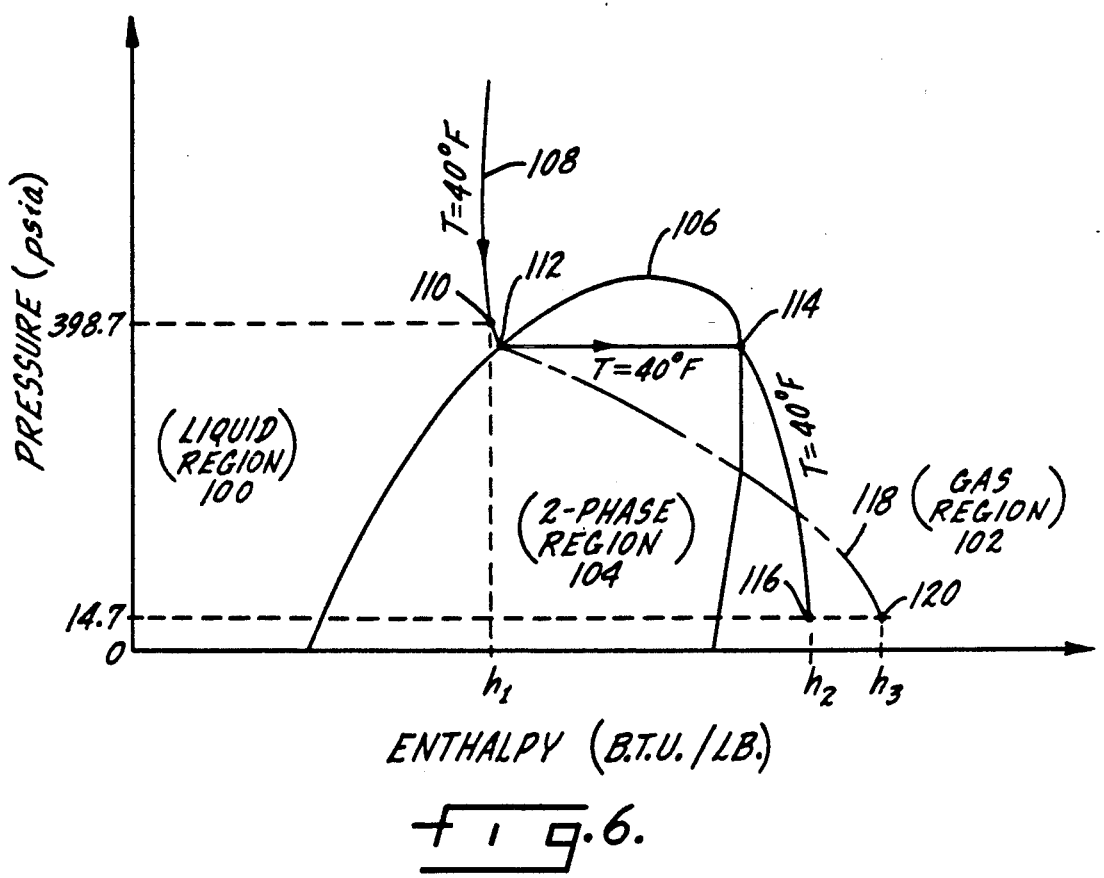
FIG. 6 is a plot of pressure against enthalpy along an isothermal line for ethane.

The amount of shear heating necessary for any particular application can be calculated. An example of such a calculation for the case of ethane is shown in FIG. 6, in a pressure-enthalpy diagram for a highly volatile liquid. Thermodynamic analysis of the enthalpy, which is measured in the amount of heat input per mass, e.g. BTU/lbs., is shown on the ordinate, or x-axis. Pressure is plotted on the co-ordinate, or y-axis, from atmospheric pressure (14.7 psia) and increasing to 400 psia and above.

Many highly volatile fluids do not directly change phase from a liquid to a gas when heat is applied at lower pressures. These fluids require an input of heat, specifically latent heat of vaporization, to enable a change of phase to occur. In the ethane example of FIG. 6, ethane in the liquid state, indicated at plotted region 100 in FIG. 6, vaporizes into a gas phase, indicated by plotted region 102. At lower pressures, i.e. below approximately 400 psia, the ethane passes through a two-phase region 104 delineated by a boundary line 106.

Also illustrated in FIG. 6 by way of example, is an isothermal line 108, taken at 40° F. for purposes of illustration. Isothermal lines can be drawn for each temperature either below or above 40° F., and for the most part, these lines are parallel to each other. As represented in FIG. 6, keeping the temperature of the ethane constant at 40° F., and reducing the pressure from a point 110, at about 400 psia, provides for the increase in ethalpy, or the amount of heat required to maintain the ethane at an isothermal temperature of about 40° F.

As the pressure is reduced, the isothermal temperature line 108 intersects the boundary line between the liquid region 100 and the two-phase region 104. At that intersection point 112, increasing the heat input (enthalpy) into the material (ethane) does not significantly reduce the pressure because the ethane is undergoing a phase change in the two-phase region. The heat input (enthalpy) provided to the ethane is all taken up by the change in phase, and the increase in enthalpy is referred to as the latent heat of vaporization. The amount of heat input is here calculated from the intersection point 112 to a second intersection point 114 at the opposite side where the isothermal line 108 intersects the boundary line 106 between the gas phase 102 and the two-phase region 104. The calculation necessarily includes the amount of fluid changing phase, which can be measured from the leakage rate.

As the ethane enters the single phase gas region, the pressure along the isothermal line 108 declines once again until it reaches point 116 at atmospheric pressure 14.7 psia. The change in enthalpy can then be calculated by measuring the difference between $h_2$ and $h_1$.

In the real life situation of a rotating gas seal, however, the lines are not totally isothermal. A decrease in temperature results when the vaporized ethane gas depressurizes as it leaks from the outer diameter to the inner diameter, as shown in FIG. 6. A countering increase in temperature is necessary to maintain the gas vaporization and flow. This temperature increase results from the continued shear heating provided by the relatively rotating seal faces. The resulting equilibrium curve is shown by a broken line 118 in the plot of FIG. 6.

The plot of the broken line 118 crosses isothermal lines as it descends to point 120, which indicates at atmospheric pressure. There is a difference in enthalpy between points 116 and 120, but the amount of this difference is not significant. The only requirement is that an additional amount of enthalpy be provided to ensure total vaporization of the ethane as the ethane approaches the inner diameter of the seal. This additional enthalpy absorbed by the vaporized ethane gas also provides a cooling capacity for the seal. As the ethane leaks from between the seal faces, it escapes in a heated state and removes excess heat generated by the rotating seal.

A primary consideration of the present invention is to provide dimensions of the sealing face components which, together with the operating parameters of the seal, provide a temperature to the liquid that corresponds to its vaporization point. A seal can be designed having appropriate structural parameters so as to achieve an equilibrium temperature between the heat input from the heat shearing and the heat outflow in the decompression heat of vaporization. A skilled engineer can calculate an equilibrium temperature to provide a minimum of gas leakage while simultaneously maintaining a continuous vaporization of the fluid for cooling purposes.

A secondary consideration is to ensure that there is a sufficient gap between the faces so as to avoid contact between the sealing rings when the shaft is rotating and also to avoid producing so much shear heating that the resulting high temperatures can damage the elements of the seal. The decrease in sealing gap and simultaneous augmentation of the amount of fluid changing phase to gas caused by the increase in shear heating creates a higher pressure in the gas between the seal faces. The increased pressure provides a stiffer, less lubricating film which creates a greater barrier to fluid or gas leaking through the seal between the seal faces. The increased dam width ratio (dam to groove ratio, $D_d/D_g$) further provides greater barrier capability to fluid leakage.

In the preferred embodiment, the mating ring 30 is formed of tungsten carbide so as to minimize distortion, while the primary ring 26 is formed of carbon, a material which runs well against the tungsten carbide mating ring and which has a Young's modulus of elasticity sufficiently low to permit alignment by the local anomolies in pressure generated by the pressure distribution. Those skilled in the art will also appreciate that the stationary primary ring 26 may be formed of hard face materials such as tungsten carbide. Other changes, such as placing the spiral grooves on the stationary ring or using different ring materials such as ceramics are within the scope of the invention.

The preferred embodiment includes spiral grooves as shown in FIG. 3 having the dimensions in the plane of the seal face discussed above. The depth of the spiral grooves and the angle to a tangent at the circumferential edge are further considerations which must be taken into account to increase the desired characteristics of the seal. Shallow grooves having depths of from about 25 to about 300 micro-inches have been found to work best. Optimally, the shallow grooves provide shear heating sufficient to lift the face of the primary ring and to provide a gap of about 50 to 100 micro-inches gap between the seal faces.

The preferred embodiment will further have grooves which are angled with respect to the outer diameter circumference. A range of angles between 10° and 30° relative to a tangent has been found to work. The preferred embodiment has angles of approximately 15°. A seal according to the specifications of the above described preferred embodiment has been successful in a LNG plant pump operating at 400 psig, 3600 rpm, 125° F., 2⅝ inch shaft diameter with a fluid of 50.5 molecular weight and a vapor pressure of 390 psig at 161° F.

It is contemplated that use of a tandem seal system, such as is described in U.S. Pat. No. 4,889,348, will further prevent leakage of the natural gas from the seal cavity. Gas which escapes from the first module is removed through the vent 68, (shown in FIG. 1) for further use or for burning off in a flare. The second seal module 24 operates as a dry running gas seal and can have conventional parameters such as is described in the aforementioned prior art. The net effect of the tandem arrangement utilizing the seal face configuration of the present invention is to prevent leakage and provide an added measure of safety in the handling of liquefied natural gas. The upstream seal module contains the liquid by adding heat to that quantity that passes across the faces 28A and 32A and converts it to a gas, and the outside or downstream seal module seals excessive leakage of the gas phase of the fluid.

Other seal configurations will become apparent once the teachings of the present invention are understood. It is contemplated that in some applications only one module, such as upstream module 22, would be used. The gasified fluid which passes across the faces 28A and 32A would pass to atmosphere.

Other considerations for optimizing the ratios to a particular fluid will come to mind to a person of ordinary skill in the art. For example, FIG. 3 illustrates the seal having a higher pressure side having the liquid and the grooved annular surface 82 at the outer diameter of the sealing face, and the atmosphere side being at the inner diameter. The opposite configuration with the sealing dam 84 at the outer diameter is also possible, and allows for the pressurized gas to be at the inner diameter and the atmosphere at the outer diameter.

In other words, the seal shown in FIGS. 3-5 are exposed to a pressurized fluid to be sealed at the radial outer diameter of the seal components. The principles of the invention, however, are applicable to seals having the high pressure at the radially inner diameter of the relatively rotating seal faces.

Whereas a preferred form of the invention has been shown and described, it will be realized that alterations may be made thereto without departing from the scope of the following claims. Accordingly, the specification and drawings are to be viewed not in a limiting sense but in an enabling sense, the invention being only limited in scope by the following claims.

What is claimed is:

1. A sealing ring for a spiral groove mechanical face seal system, the seal system for sealing a rotatable shaft extending through a housing against leakage of a high vapor-pressure liquid and including spaced apart upstream and downstream modules, said upstream module comprising means to change the phase of said liquid to be sealed including a seal having a primary sealing ring affixed to the housing and a mating sealing ring affixed for rotation with the shaft, one of the sealing rings comprising a radially extending seal face having first and second circumferential edges and including a plurality of downstream pumping spiral grooves extending inwardly from said first circumferential edge of the seal face to a circumferential boundary intermediate said first and second circumferential edges, the circumferential boundary and the first circumferential edge defining a groove portion having a radial width taken between said boundary and said first edge in a radial direction, and the circumferential boundary and the second circumferential edge defining a dam portion having a radial width taken along a radius between said second edge and said intermediate line, said spiral grooves in said groove portion having a shallow groove depth of between about 25 microinches to about 300 microinches and being separated by a plurality of lands disposed between said spiral grooves, the surface of the lands being in a plane substantially coextensive with a plane defined by said dam portion of said sealing ring, the grooves and lands defining a groove surface area and a land surface area, and a ratio of the land surface relative to the groove surface area being greater than one.

2. The sealing ring according to claim 1 wherein the total surface area of the lands relative to the surface area of the grooves is in a ratio of from about 1.5 to about 8.0.

3. The sealing ring according to claim 2 wherein the ratio of total land surface area to total groove surface area is in a range of about 2.5 to about 3.5.

4. The sealing ring according to claim 3 wherein said ratio is approximately 3.0.

5. A sealing ring for a spiral groove mechanical face seal system, the seal system for sealing a rotatable shaft extending through a housing against leakage of a high vapor-pressure liquid and including spaced apart upstream and downstream modules, said upstream module comprising means to change the phase of said liquid to be sealed including a seal having a primary sealing ring affixed to the housing and a mating sealing ring affixed for rotation with the shaft, one of the sealing rings comprising a radially extending seal face having first and second circumferential edges and including a plurality of downstream pumping spiral grooves extending inwardly from said first circumferential edge of the seal face to a circumferential boundary intermediate said first and second circumferential edges, the circumferential boundary and the first circumferential edge defining a groove portion having a radial width taken between said boundary and said first edge in a radial direction, and the circumferential boundary and the second circumferential edge defining a dam portion having a radial width taken along a radius between said second edge and said intermediate line, being separated by a plurality of lands disposed between said spiral grooves, the surface of the lands being in a plane substantially coextensive with a plane defined by said dam portion of said sealing ring, the grooves and lands defining a groove surface area and a land surface area, and the ratio of the radial width of said dam portion relative to the radial with of said groove portion is greater than 1.

6. The sealing ring according to claim 5 wherein the ratio of the radial width of said dam portion to the radial width of said groove portion is from about 1.5 to about 8.0.

7. The sealing ring according to claim 6 wherein the ratio of the radial width of the dam portion relative to the radial width of the groove portion is approximately 3.0.

8. The sealing ring according to claim 3 wherein the ratio of the radial width of the dam portion relative to the radial width of the groove portion is approximately 3.0.

9. The sealing ring according to claim 4 wherein the ratio of the radial width of the dam portion relative to the radial width of the groove portion is approximately 3.0.

10. The sealing ring according to claim 1 wherein said spiral grooves are symmetrically disposed about the circumference of said seal face and a ratio of the circumferential dimension of each said land relative to the circumferential dimension of each said groove is greater than one.

11. The sealing ring according to claim 10 wherein the ratio of the circumferential dimension of each said land relative to the circumferential dimension of each said groove is between approximately 1.5 to approximately 8.0.

12. The sealing ring according to claim 11 wherein said ratio is approximately 3.0.

13. The sealing ring according to claim 12 wherein the ratio of the radial width of the dam portion to the radial width of the groove portion is in a ratio greater than one.

14. The sealing ring according to claim 13 wherein the ratio of the radial width of said dam portion to the radial width of said groove portion is from approximately 1.5 to approximately 8.0.

15. The sealing ring according to claim 14 wherein the ratio of the radial width of said dam portion to the radial width of said groove portion is approximately 3.0.

16. The sealing ring according to claim 5 wherein the spiral grooves further comprises a shallow groove depth of between about 25 microinches to about 300 microinches.

17. The sealing ring according to claim 6 wherein the spiral grooves further comprise a shallow groove depth of between about 25 microinches to about 300 microinches.

18. The sealing ring according to claim 7 wherein the spiral grooves further comprise a shallow groove depth of between about 25 microinches to about 300 microinches.

* * * * *